United States Patent [19]
Dujari et al.

[11] Patent Number: 6,119,153
[45] Date of Patent: Sep. 12, 2000

[54] ACCESSING CONTENT VIA INSTALLABLE DATA SOURCES

[75] Inventors: Rajeev Dujari, Kirkland; Adriaan Canter, Seattle, both of Wash.

[73] Assignee: Microsoft Corporation, Redmond, Wash.

[21] Appl. No.: 09/067,342

[22] Filed: Apr. 27, 1998

[51] Int. Cl.[7] .......................... G06F 15/16; G06F 15/173; G06F 17/30
[52] U.S. Cl. .......................... 709/218; 709/225; 709/232; 707/10
[58] Field of Search .................................. 709/218, 225, 709/232; 707/10

[56] References Cited

U.S. PATENT DOCUMENTS

| | | | |
|---|---|---|---|
| 5,737,599 | 4/1998 | Rowe et al. ............................. | 707/104 |
| 5,787,470 | 7/1998 | DeSimone et al. ..................... | 709/218 |
| 5,889,958 | 3/1999 | Willens .................................... | 709/229 |

*Primary Examiner*—Krisna Lim
*Attorney, Agent, or Firm*—Michalik & Wylie, PLLC

[57] ABSTRACT

A method and system for increasing perceived Internet browser performance by using a relatively high-bandwidth data source such as a CD-ROM and/or a hard drive directory as a local cache of Internet content. The content is provided by content providers via some high-bandwidth data source such as a CD-ROM media for a CD-ROM drive. An install program provided with the content registers with the system one or more URL patterns such as prefixes corresponding to the content, in association with one or more file system patterns (e.g., prefixes) corresponding to a cache container (file system directory). When subsequently browsing to a URL having a matching pattern, the URL pattern is resolved to the cache container, which is then used with the rest of the URL to construct a local file reference. The local file is accessed from the high-bandwidth data source. If the local file is not found, the original http URL is instead used, whereby the content is downloaded in the normal manner. The installable cache may reside on a CD-ROM or other removable media, whereby an autorun program or script that executes each time the media is inserted into a drive updates the registered drive letter.

40 Claims, 9 Drawing Sheets

|  URL Information | File system Information |
| --- | --- |
| Pattern1 | D: PatternA |
| Pattern2 | D: PatternB |
| Pattern3 | D: PatternC |
| Pattern4 | E: PatternD |
| Pattern5 | D: PatternE |
| Pattern6 | E: PatternF |
| Pattern7 | E: PatternG |
| Pattern8 | D: PatternH |
| ⋮ | ⋮ |
| Pattern$_n$ | D: Pattern$_n$ |

URL to Filesystem Pattern Mapping — 80

FIG. 4B

| File Identity | Cache Directory | File Status |
| --- | --- | --- |
| Pattern\Filename1 | SubdirA | -- |
| Pattern\Filename2 | SubdirB | -- |
| Pattern\Filename3 | SubdirC | -- |
| Pattern\Filename4 | SubdirD | -- |
| ⋮ | ⋮ | ⋮ |
| Pattern\Filename$_j$ | Subdir$_k$ | -- |

88 — Special Cache Location Index — 86

ACCESSING CONTENT VIA INSTALLABLE DATA SOURCES

FIELD OF THE INVENTION

The invention relates generally to computer systems and networks, such as intranets and the Internet, and more particularly to improving the perceived performance of applications that access network content.

BACKGROUND OF THE INVENTION

For network client applications, such as web browsers, a limiting performance factor is often low bandwidth to the server. To mitigate this low-bandwidth problem, network client applications often cache content replicated from servers, so that as much information as possible is kept available on the client user's hard drive. To cache content, the local machine generates a filename from the content's URL (Uniform Resource Locator) and stores the file in the application's cache directory (folder). As data access times from the hard drive are typically orders of magnitude faster than download times, some or all of a server's content may often be rapidly accessed from the cache with little or no downloading of data from the server. In the extreme case, the computer or server may be offline from the network, in which case the cache may still provide some version of the content.

While content caching thus provides substantial performance improvements, one problem is the time taken for the downloading of the content into the cache. Because this downloading operation can be extremely slow, particularly with large amounts of data, content providers are seeking alternative delivery vehicles, such as CD-ROMs, for pre-filling browser caches, especially for static content. One known approach to pre-filling caches with content is to copy the content from a CD-ROM or the like into the web cache of an application, such that when seeking to retrieve the content, the application will find the desired content in the cache as if it was previously downloaded and cached. However, this is a relatively slow and space-consuming process, given the capacity of CD-ROMs versus a typical hard drive. For example, CD-ROMs may contain approximately 650 megabytes of data, which may be distributed among thousands of files, and thus it may take a long time to copy such a large amount of data into the cache. Moreover, if the browser cache enforces a size quota, the pre-filling operation may overflow the cache and/or displace existing content. In turn, the pre-filled cache files may be displaced by other content that is subsequently downloaded or pre-filled. Thus, this approach has a number of drawbacks associated therewith.

Another approach is to author web pages using "file:" references" to hard drives or CD-ROMS. When the page is accessed, the application retrieves the content from the appropriate media location, as determined by the file system reference, rather than from the web site. However this approach is restrictive because drive letters of personal computers may be configured many different ways. If the drive letter or letters chosen by the web site do not correspond to the right type of drive, or not enough space is available, then errors will likely occur and the user will see error messages.

SUMMARY OF THE INVENTION

Briefly, the present invention provides a system and method for increasing the perceived performance of a network application such as an Internet browser by using a relatively high-bandwidth data source such as a CD-ROM and/or a hard drive directory as a local cache of network content. The content is provided by content providers via some high-bandwidth data source, such as a CD-ROM media for a CD-ROM drive. When the network application receives a request to retrieve content based on a URL, the URL is resolved to a local file system cache container, which is then used with the rest of the URL to construct a local file reference (path and filename). To this end, one or more URL patterns (such as URL prefixes) corresponding to the content may be registered in a registry in association with one or more file system patterns (e.g., prefixes) corresponding to a cache container, (i.e., a file system directory). The corresponding file system prefix may then be looked up via the registered URL pattern. Once the file system reference (path and filename) is determined, the cached file is accessed from the high-bandwidth data source. If the local file is not found, the original URL is instead used to fetch the content from the network, whereby the content is downloaded in the normal manner. The installable cache may reside on a CD-ROM or other removable media, whereby an autorun program or script that executes each time the media is inserted into a drive updates the registered drive letter.

Other advantages will become apparent from the following detailed description when taken in conjunction with the drawings, in which:

DETAILED DESCRIPTION

Exemplary Operating Environment

Figure 1:
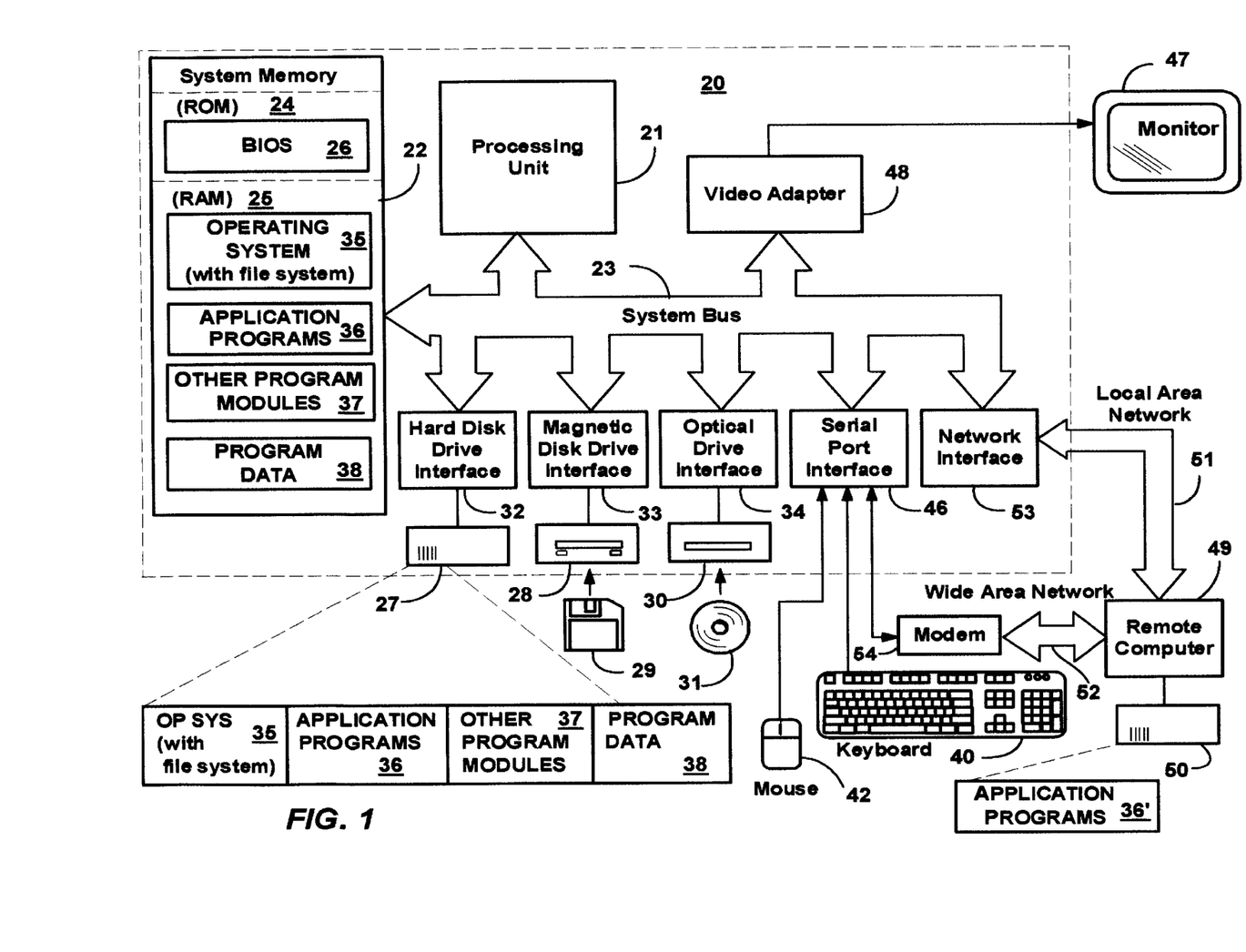
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, (including a file system therein and/or associated therewith), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Downloadable Network Content

Figure 2:
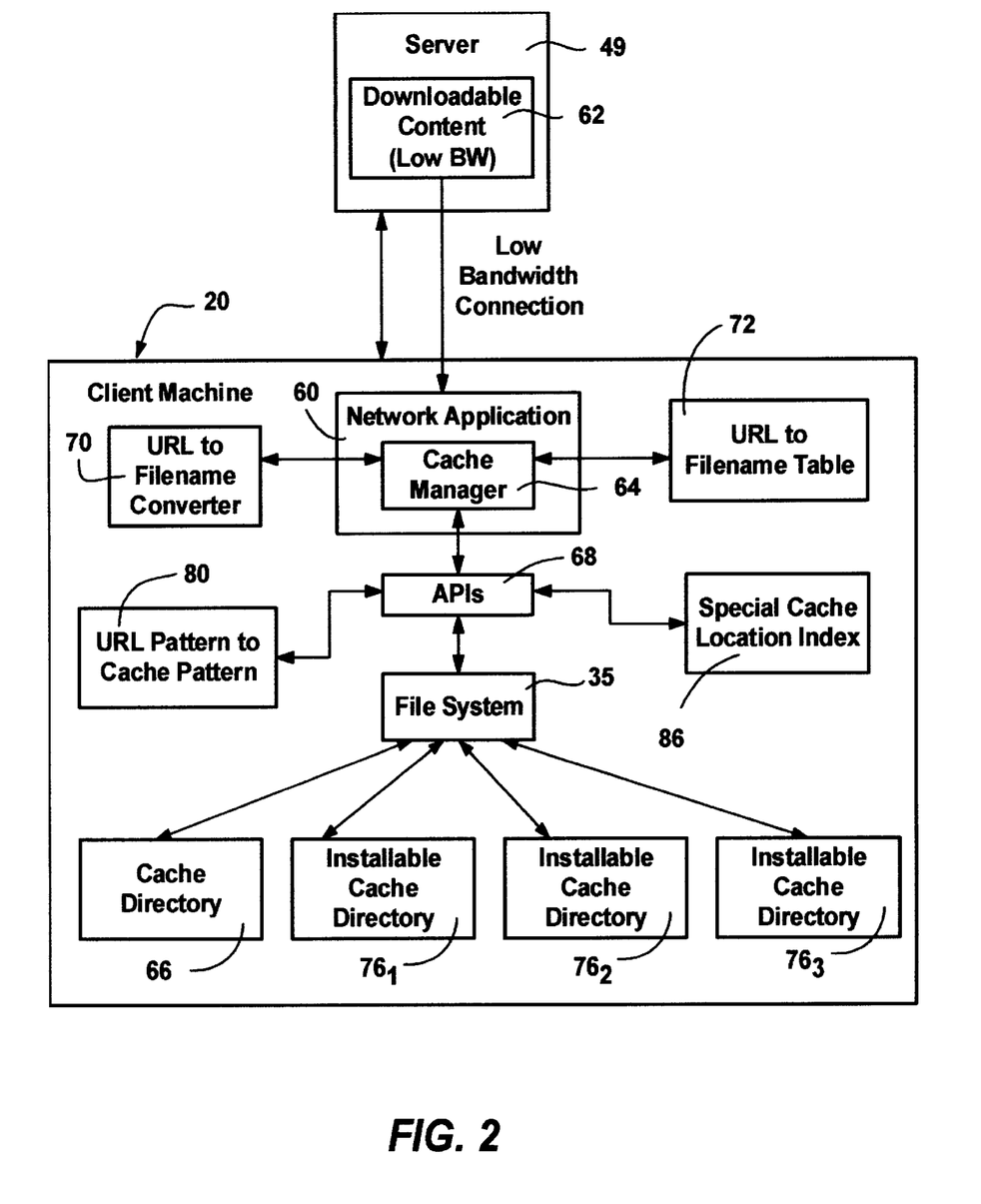
FIG. 2 is a block diagram generally representing components for accessing content from various data sources in accordance with one aspect of the present invention.

As shown in FIG. 2, an application 60 (e.g., web browser) of the client system 20 is capable of communicating with a server (e.g., the remote computer 49) in order to download network content 62 therefrom, such as over a dial-up connection. Communication between the client 20 and the server 49 may take place using one of several well-known network protocols, such as hypertext transfer protocol (HTTP), file transfer protocol (FTP), Common Internet File System (CIFS) protocol, or Gopher, although for purposes of simplicity, the invention will be primarily described with respect to HTTP. Content available through these protocols may also be downloaded from the server to the client by alternative means, such as a multicast protocols. As used herein, "server" or "network server" includes any machine or combination of machines having content thereon. Network servers may thus include http "web sites," including those having sites with different names (which may be regarded as different virtual servers even if they are hosted on the same physical machine). Note that a web site may be distributed over many virtual servers, which in turn may be distributed over many physical machines.

In any event, the network application 60 includes or otherwise accesses a cache manager component 64 that, among other functions, includes code for caching and retrieving from at least one application cache (directory) 66 some or all of the downloaded content 62, ordinarily via application programming interface (API) calls through APIs 68 to the operating/file system 35. Each distinctly-referenced portion of a server's network content 62 (e.g., a web page) is identified by a server reference known as a URL (Uniform Resource Locator), and may be stored as a file in the cache directory 66. Note that some or all of the various components referenced herein may be combined with or included within other components, while others may be separate from one another and be appropriately invoked as needed. For example, the cache manager component 64 may be part of the network application 60 (e.g., browser) code, or may be a separate component, (e.g., object, dynamic link library function and so on) that other network applications may call on.

To store and retrieve application-cached files, as shown in FIG. 2, the cache manager component 64 includes or accesses a mechanism 70 for converting server references (URLs) to local file system filenames. Although URL names and the like provided by servers often resemble filenames, certain characters in the URL name may not be allowed in a particular file system, and thus the converter 70 substitutes appropriate characters as necessary. Also, the name may be decorated, say by a appending a number, to distinguish it from a file for a similar, but different, URL. Note that a converter could generate random file names, however from the user's viewpoint, the use of user-friendly file names provides many advantages over randomized filenames, and thus the preferred converter attempts to match names as closely as possible to their URL names. In any event, after converting the names to corresponding file names, the server references and their corresponding local filenames are maintained in a table 72 or the like.

Installable Network Caches

Figure 3:
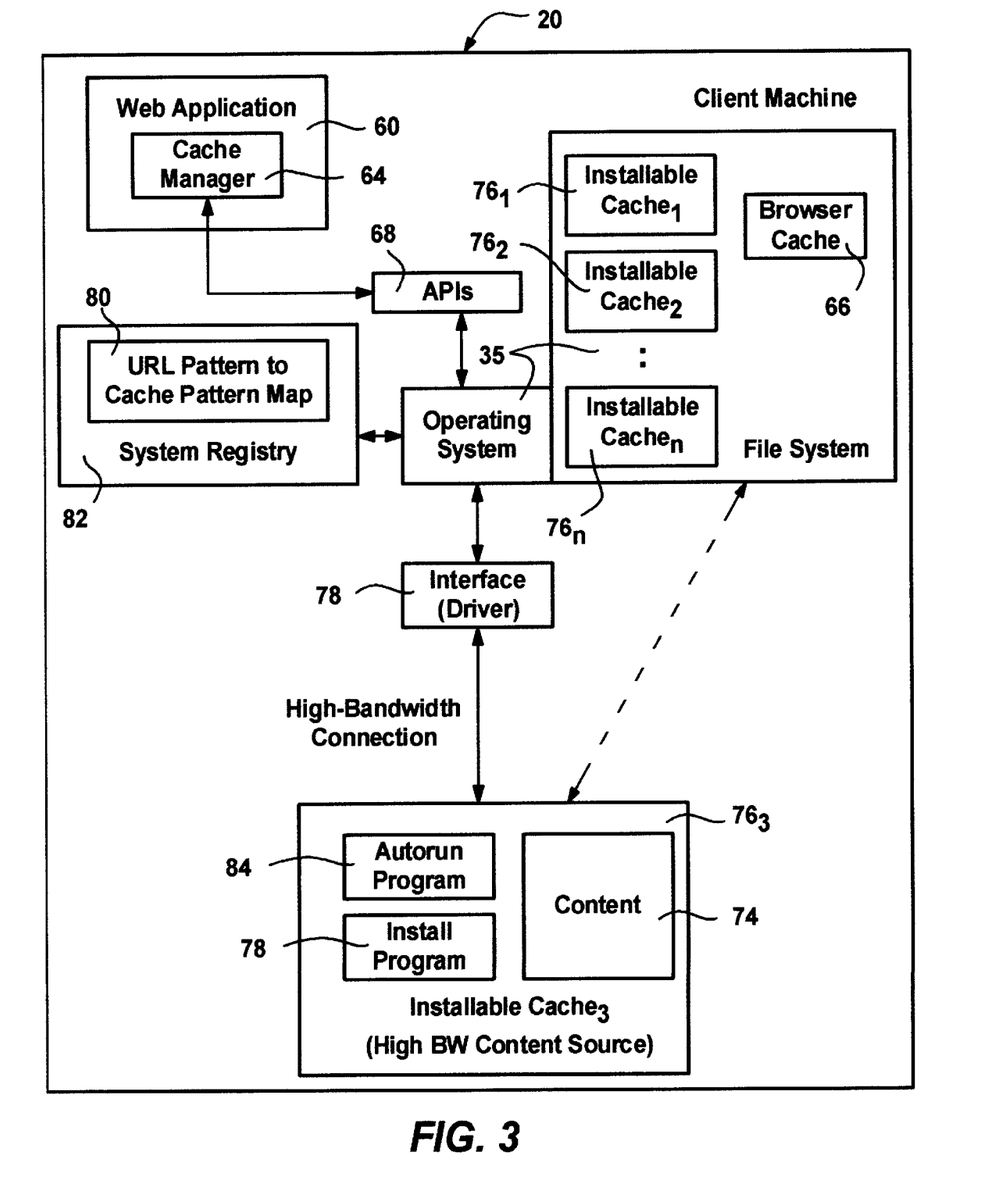
FIG. 3 is a block diagram representing various components in a client computer system for using installable caches in accordance with one aspect of the present invention.

FIG. 3 shows a generalized model of the present invention wherein a network (web) application 60 such as a browser in a client machine (e.g., the personal computer system 20) further caches content 74 (FIG. 2) from relatively high bandwidth data sources $76_1$–$76_n$ in an installable manner that allows content therein to be referenced via a local file system reference or equivalent, e.g., "drive:pathfilename." The content sources $76_1$–$76_n$ ordinarily have a significantly higher data transfer bandwidth than the content 62 (FIG. 2) downloaded from the network server 49, e.g., the content source $76_3$ is a CD-ROM device as opposed to a 28.8 kbps modem dial-up connection to the server 49. For purposes of simplicity herein, the present invention will primarily be described with reference to a CD-ROM as the content source $76_3$, wherein the CD-ROM is part of the client machine 20 and a suitable interface (driver) 78 connects the CD-ROM 20 to the operating system/file system 35. However, as will be readily appreciated, the present invention includes virtually any source of content having a higher bandwidth connection than that via which network content 62 (FIG. 2) is otherwise accessed, as long as the higher-bandwidth source can be represented as symbols (e.g., a filename string) stored in memory. For example, other types of content sources include DVD-ROMS, optical disks, cable modems, satellite receivers, high-speed connections to other computers, (e.g., T1 and T3 connections), network drives and so on, whether or not the source is considered part of the client machine 20.

In accordance with one aspect of the present invention, content 74 is installed as cached content on the client machine 20. Note that the content need not be copied from any particular data source (e.g., medium) to the hard drive, as the data source/medium itself may serve as the installable cache. For example, content may reside on a CD-ROM, such that when installed, the CD-ROM becomes the cache container $76_3$ accessible to the cache manager component 64. To enable the manager component 64 to use the installable caches $76_1$–$76_n$, an install program 78 or the like associated with the cached content 74 registers information corresponding to the network URLs of the various content in association with information corresponding to a local reference (e.g., a file system directory) in a registry 80. Preferably, as further represented in FIGS. 4A and 4B, this registry 80 comprises a registry of mappings of URL patterns to cache (directory) prefix information, and is maintained in the system registry 82. More particularly, for the http protocol, part of the http: hierarchy is mapped to a file system container, i.e., a particular directory of the file system 35. For example, a URL: prefix such as http://www.microsoft.com/imagelib/ may be mapped to a file:

prefix, such as file://e:\msware\images. When the browser's cache manager component 64 later receives a URL request that matches a registered prefix, e.g., http://www/microsoft.com/imagelib/logos/ie4.gif, as described in more detail below, the manager component 64 converts the URL prefix to the file system prefix by looking up the associated file system prefix in the mapping table 80, (e.g., e:\msware\images), and uses file system prefix to construct the resultant file reference, e.g., file://e:\msware\images\logos\ie4.gif. As can be readily appreciated, prefixes are preferably employed to take advantage of the hierarchical organization of typical network sites and file systems, however it is alternatively feasible to register other information that will provide an equivalent result of using the URL of content of a low-bandwidth source to determine a unique identity of content of a high-bandwidth source. For example, rather than register prefixes, each URL and associated file system reference could be stored in a one-to-one correspondence. Another alternative is to hash the URLs into an index value and store a file identity (a string or number corresponding thereto) indexed by that value. Moreover, the mappings can be organized in some manner (e.g., alphabetized) to expedite the lookup. Note that such mappings depend on the content providers using unique file system prefixes, however this may be handled by requiring conforming providers to use only approved prefixes, such as those based on the unique domain name of their corresponding site.

Thus, alternatively, in determining if a URL is within an installable cache, more generic pattern rules may be used instead of prefix matching. For example, a string such as "http://server/coolstuff/???/images/ might translate to "file://d:\stuff\" or "file://d:\stuff\???\", where "???" refers to a directory name not containing a slash ('/') delimiter. A pattern that spans multiple protocols and servers, such as "*://???/localstuff", may be translated to "file://g:\???\", where "*" refers to any URL protocol and "???" is any server name. These sorts of translations are particularly applicable where hash functions or an explicit manifest of the installable cache content are employed for registering the information.

Figure 4A:
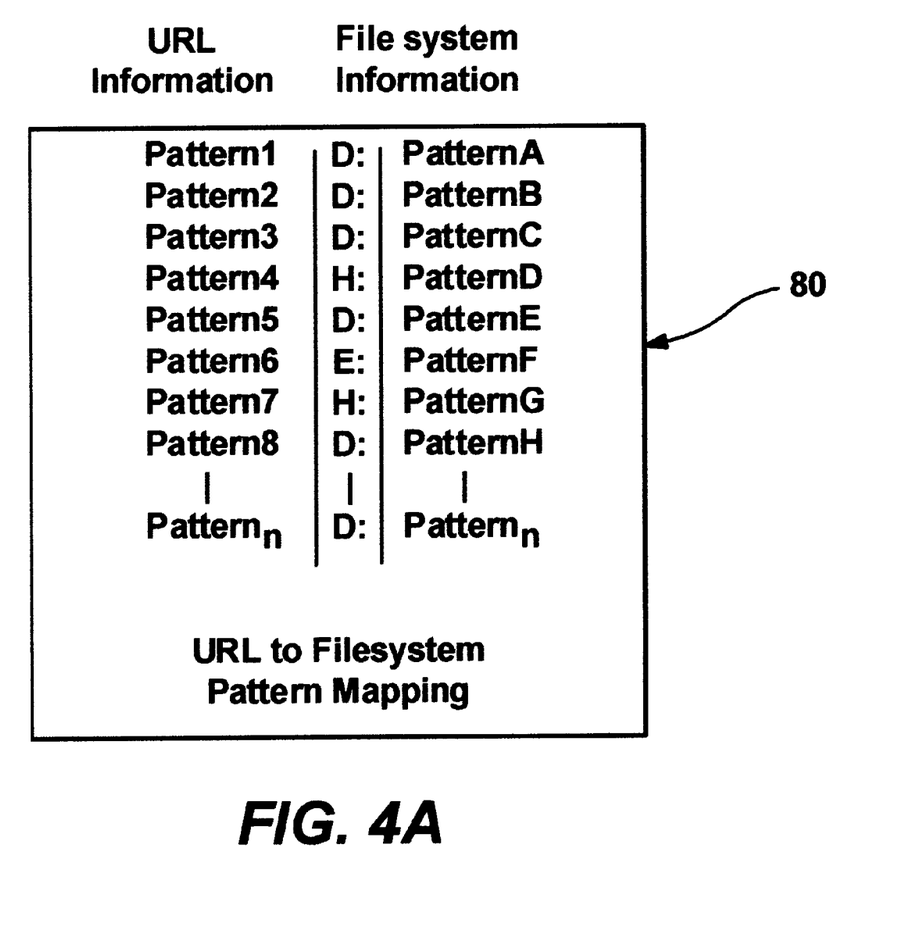
FIGS. 4A and 4B are representations of a table of registered mappings maintained over time for relating network patterns to file system patterns of installable cached files.
Figure 4B:
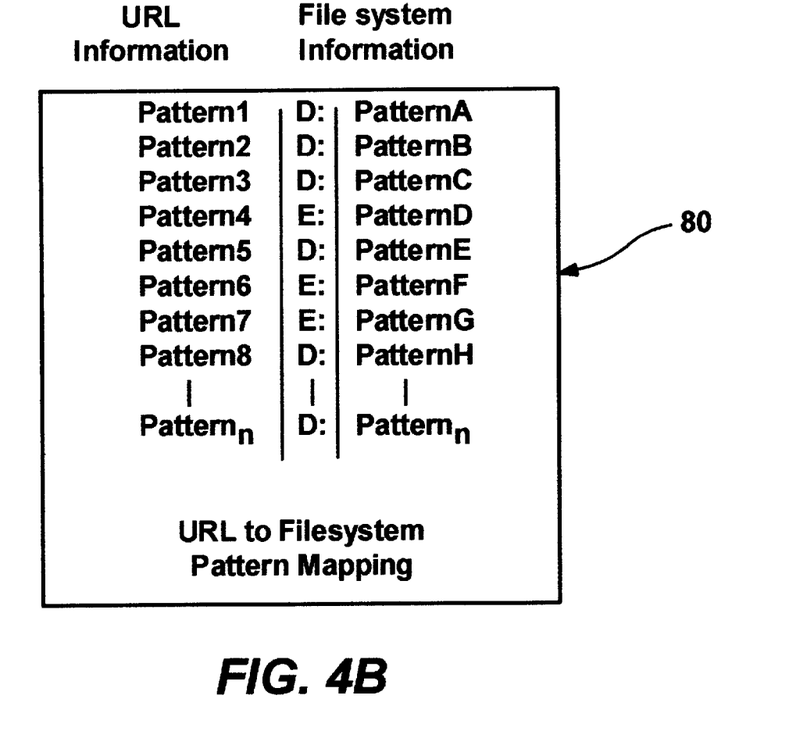
Figure 6:
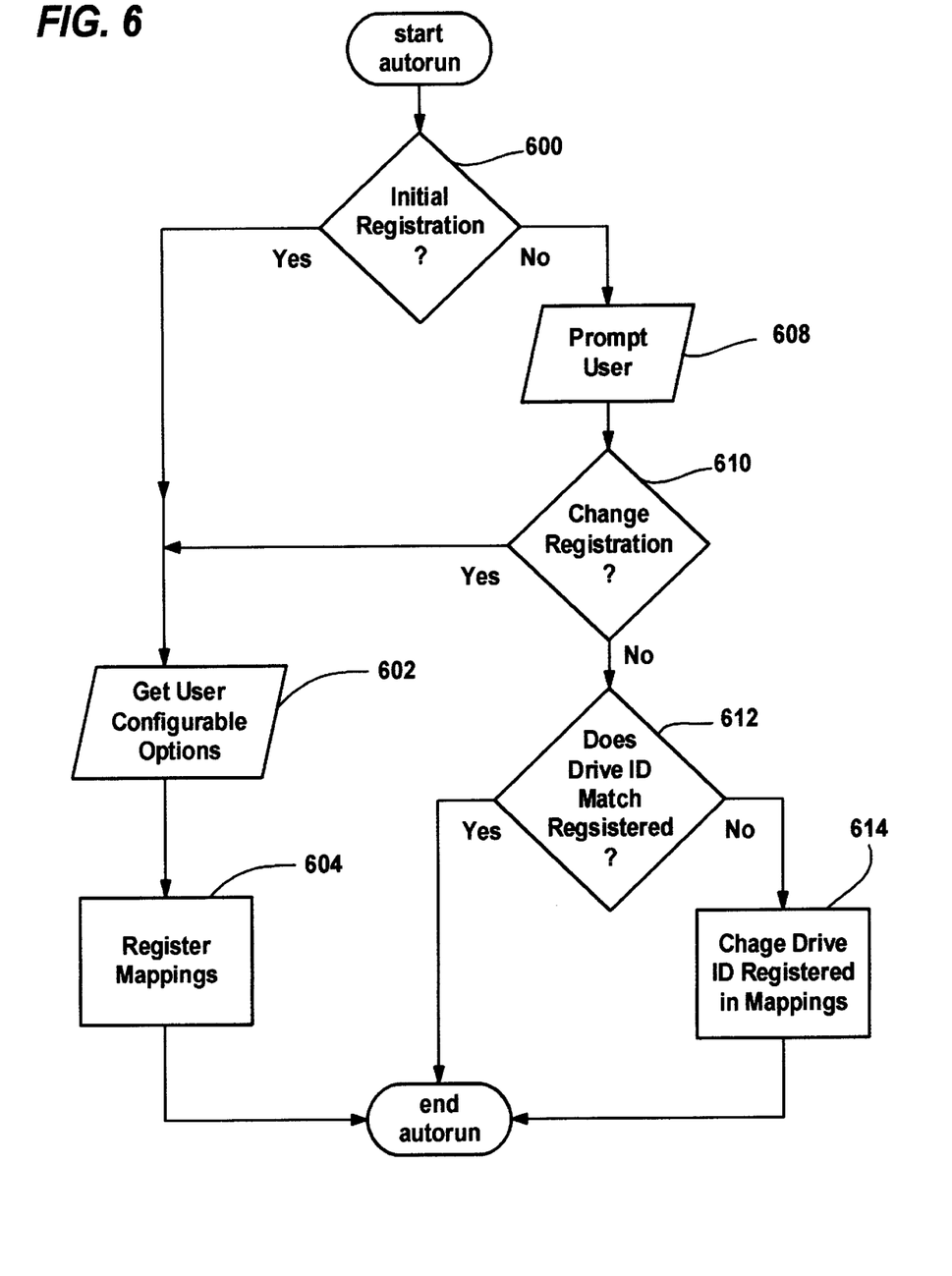
FIG. 6 is a flow diagram generally representing the steps taken when installing a network cache on a client system in accordance with one aspect of the present invention.

To register the mappings, the install program 78, e.g., within a CD-ROM Autorun program 84 or invoked thereby, adds the patterns (e.g., prefixes) to the registry of mappings 80 (FIG. 4A). Note that the registering of mapping information is a relatively quick operation (a small, constant time overhead) and is independent of the size of the cache being installed. FIG. 6 shows the general steps taken by the Autorun program 84, script or the like when it is run, such as each time its CD-ROM medium is inserted into a drive. At step 600, following any user interaction or the like, the Autorun program 84 determines if its URL-to-file pattern mappings are already registered, i.e., if the program has been previously run on the system 20. This may be performed by scanning the registry of mappings 80 to look for a known URL. If at step 600 this is the initial registration, the Autorun program 84 may invoke the install portion 78, which in turn may selectively install versions of the content according to external factors such as user preferences. For example, the install program may prompt the user at step 602 via a suitable user interface to determine if the user has any particular preferences for configuring how the content is installed. Note that because the content provider also provides the Autorun and install programs, the programs may be customized based on the type of content being provided. For example, a CD-ROM may include content in various languages, whereby users may be given language options or the like from which to select, such as the option to selectively copy only the English language files from the CD-ROM to the hard drive. The user also may be given the option to copy some or all of the content to a hard drive directory for faster access. Other configurable options, such as those based on system information, (e.g., copy files to the hard drive if enough disk space is available) may also be performed at this time. In any event, once any preferences are obtained, the mappings of the URL patterns (e.g., prefixes) to file system patterns (e.g., prefixes) are written into the mapping registry 80 at step 604.

If at step 600 the Autorun program 84 determines that its mappings are already registered, then step 600 branches to step 608 to (optionally) prompt the user to find out if any changes are desired. For example, the user may wish to re-register the mappings with a different set of configuration options, such as to instead register Italian language content, whereby steps 608 and 610 give the user the opportunity to make such changes. Note that step 608 also provides the opportunity for an uninstall option to be invoked.

In accordance with another aspect of the present invention, the Autorun program 84 adjusts the mappings as necessary to reflect the drive letter of the device into which the medium storing the content is installed. To this end, step 612 may be performed to determine if the drive in which the medium is currently running is the same drive letter as those registered for any content. For example, if a CD-ROM (or other removable media) is serving as an installable cache $76_3$, and a system has more than one CD-ROM drive or has otherwise re-arranged its drive assignments since the patterns were mapped, the drive letter previously registered for the file system patterns may no longer be correct. If any do not match, step 614 is executed to update the registered drive letter with the correct letter. For example, as the Autorun program 84 scans the mapping registry 80 to detect its own URL patterns (represented in FIG. 4A by "Pattern4" and "Pattern7"), it changes the drive letter shown as "H:" in FIG. 4A to the letter of the drive in which its medium is now running, e.g., "E:" in FIG. 4B. Of course, the drive letter updating step may take place concurrently with any prompts/user interface activity to expedite the updating process.

Note that some or all of the cached content 74 may be copied to a hard drive (e.g., the hard disk drive 27 of FIG. 1), whereby the set of cached content may be maintained in files on the hard drive, files on the CD-ROM or other media, or some combination of both. Rather than use the application's (e.g., browser's) cache 66 to store the files, (which may lose the files via a quota), an installable cache (e.g., $76_2$) may be created in the form of a special directory for each set of content put on the hard drive, e.g., one subdirectory for each registered URL pattern. Note that this extends the installable cache, particularly for read-only media, which unlike read-write media, cannot be directly updated with content. For example, any content files of the above example that are copied to the hard drive may be placed in a directory named C:\Windows\Temporary Internet Files\Msware\Images. Indeed, as will be described in more detail below, small files such as of a CD-ROM may be placed on the hard drive to minimize the access times thereof, while large files may remain on the CD-ROM, which, although slower to access, eliminates the copying time while not taking up space on the hard drive. In addition, as described below, files that supplement the installable cache but which are not on the medium may be downloaded to the corresponding special cache directory, thereby extending the installable cache. For each installable cache, a special index 86 (FIG. 5) is maintained for any files cached on the hard drive as a result of a retrieval from the CD-ROM, so that the cache manager component 64 can rapidly determine whether a given file can be retrieved from its installable cache $76_2$ on the hard drive (higher speed) or if it needs to be retrieved from the CD-ROM $76_3$ source (slower speed). In other words, the special directory serves as an installable high-speed cache $76_2$ for the lower speed installable cache $76_3$, wherein the special index 86 serves to facilitate the use of the high-speed cache $76_2$.

Figure 7A:
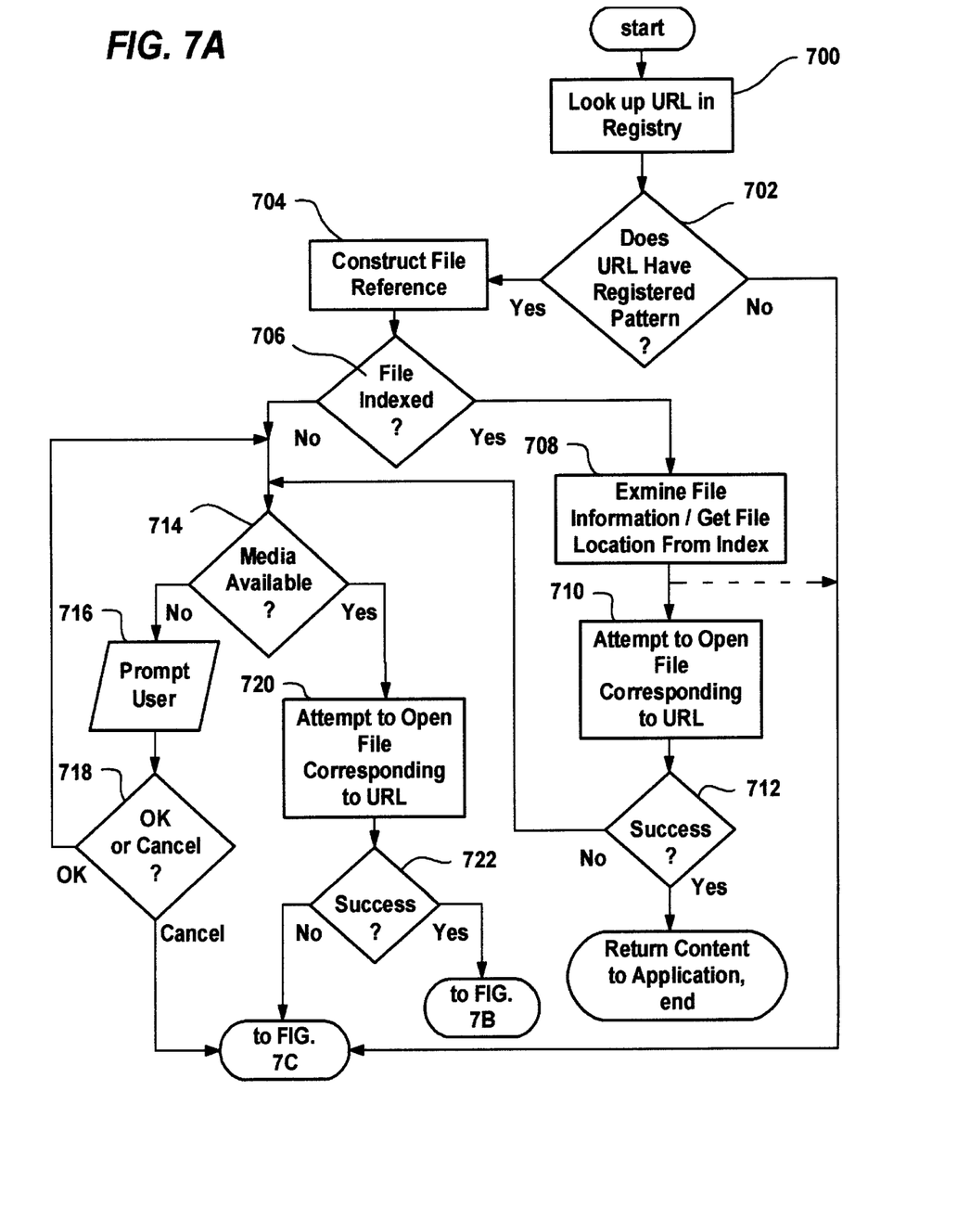
FIGS. 7A, 7B and 7C comprise a flow diagram generally representing steps for accessing content from various data sources including installable network caches in accordance with one aspect of the present invention.
Figure 7B:
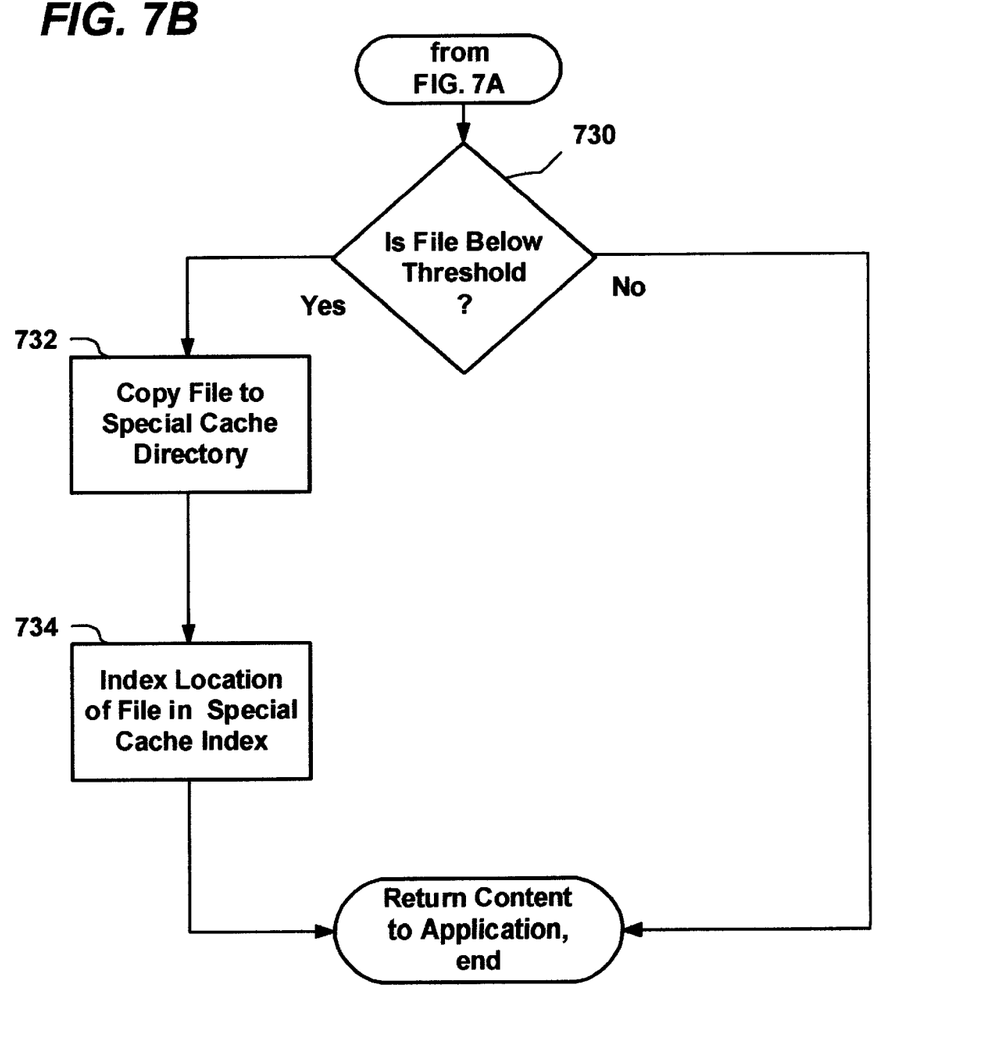
Figure 7C:
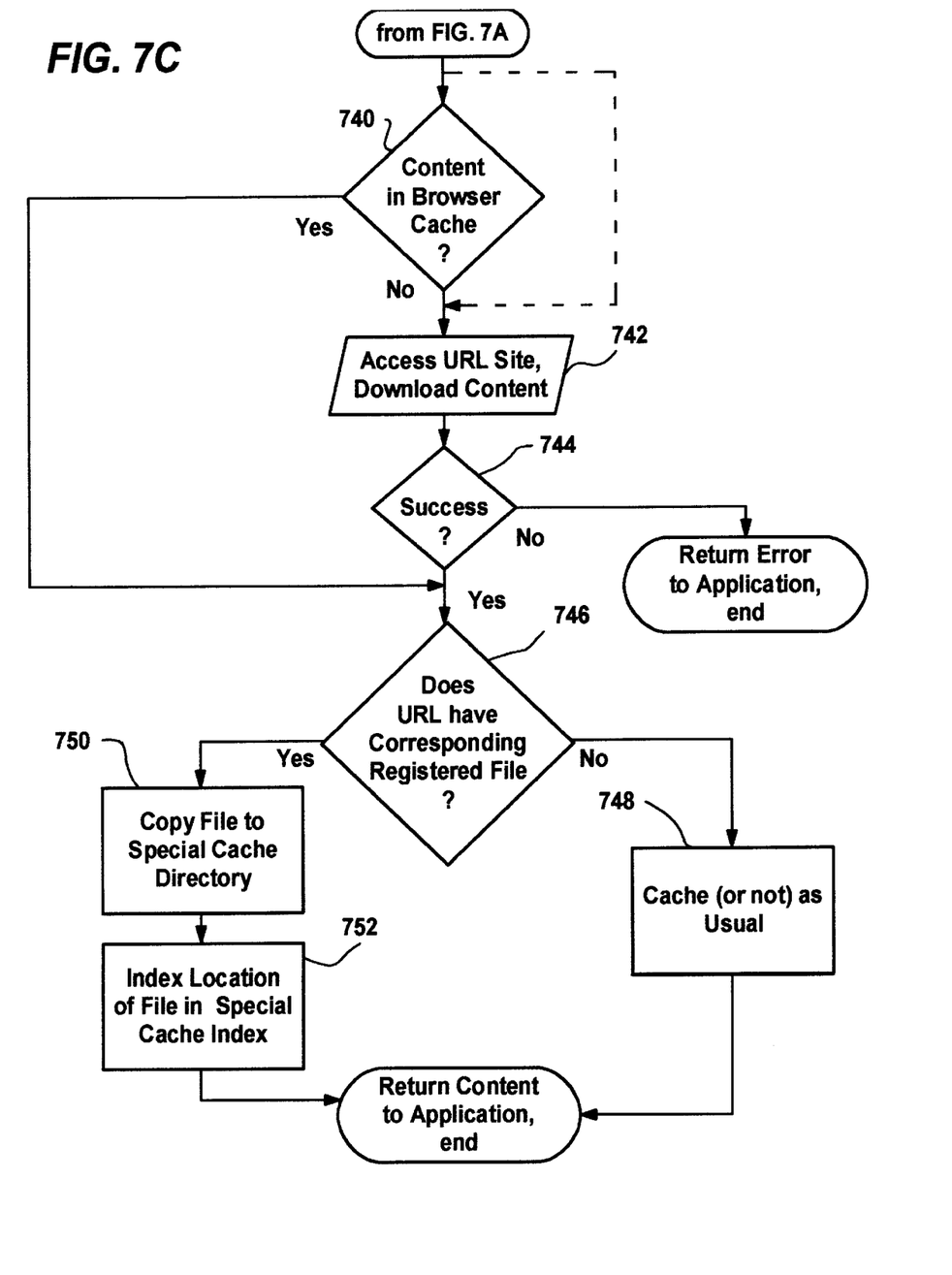

Turning to an explanation of the operation of the present invention after the mappings have been registered and drive letters updated, FIGS. 7A–7C represent exemplary steps taken by the cache manager component 64 to retrieve content once the application 60 is given the content's URL. In general, the cache manager component 64 includes a retrieval process that first tries to obtain cached content from any special cache directory (e.g., $76_2$) on the hard drive, and if not found, then from any installable caches independent from the hard drive (e.g., $76_3$), and lastly via a server 49 download. Note that content is accessed for attempted retrieval from an installable cache identified in the mapping registry 80, and only if that retrieval is attempted and fails is a server download initiated.

At steps 700–702, the cache manager component 64 retrieval process first looks to see if the URL has a corresponding pattern registered therefor in the mapping registry 80. To locate a corresponding pattern, each component part of a URL that might make up a pattern may be tested, or various rules about patterns may be enforced. For example, to expedite lookups, a rule might be enforced such that registered patterns in the form of prefixes can only have between two and four component names, such as http://www.microsoft.com/imagelib/location1/location2, http://www.microsoft.com/imagelib/location1, or http://www.microsoft.com/imagelib. In any event, if a pattern is registered for the URL at step 702, the cache management component 64 locates it and obtains the name of the file system pattern (e.g., prefix) maintained in association therewith, e.g., e:\msware\images, and at step 704 uses the pattern/prefix to construct the full file system path name of the file based on the remaining (non-prefixed) portion of the URL, e.g., e:\msware\images\logos\ie4.gif. If no pattern is registered, then step 702 branches to FIG. 7C, wherein the application 60 will attempt to retrieve the content in its usual manner, i.e., via its own cache 66 or by downloading.

At step 706, the cache manager component 64 retrieval process then checks to see if the file is indexed in the special index 86. If so, then a copy of that file is supposed to be cached on the hard drive, whereby at step 708 the location of that file on the hard drive is obtained, and at step 710 an attempt is made to open that file. If the file is successfully opened, as evaluated at step 712, then the content therein is read, returned to the application 60, and the retrieval process ends. If not successful at step 712, for example if the special directory was purged but the index 86 was not updated, it is still possible that the file is available on an installable cache, e.g., the cache 763 of the CD-ROM. Thus, after any suitable error-handling procedures, (e.g., to remove the file reference from the special index, not shown), step 712 branches to step 714 as if the file was not listed in the special index.

If the file is not indexed or as indexed, was not able to be opened, step 714 is executed, which tests to see if the installable cache of the identified media is available. For example, a browser application 60 may receive a URL request to fetch content, and the registry 80 may have a mapping therefor to a file on a CD-ROM drive $76_3$, but the disk may not be inserted into the drive. Similarly, the registry may have a mapping to a network drive, but the network may be down. In any event, if the media/data source is not available, step 714 branches to step 716 to prompt the user appropriately, e.g., insert the appropriate medium and OK a retry, or cancel. If the user retries as determined by step 718, step 714 is re-executed, while if the user cancels, then at step 718 the retrieval process branches to FIG. 7C to attempt to retrieve the content from another source, i.e., the browser's cache 66 or the network 49 via a download.

If the media was available at step 714, then step 720 is executed to attempt to open the file from the media comprising the installable cache, e.g., $76_3$. If the file open operation is successful, as detected by step 722, the retrieval process branches to the steps of FIG. 7B (described below), while if unsuccessful the process instead branches to the steps of FIG. 7C, (described below). Note that steps 714 and 720 may be combined, i.e., attempt to open the file, prompt if not found or not available, however by separating the tests, the user prompt may be made more specific (e.g., wrong CD versus correct CD, but no such file). Moreover, having separate tests at step 716 and 722 allows a content provider to register a mapping for a file that intentionally or otherwise does not exist on the media. As described below, omitting a file with a corresponding mapping registered therefor causes the file to be (ordinarily one-time) downloaded into the special installable cache directory corresponding thereto, thereby providing a mechanism to extend the installable cache content of the CD-ROM (or other media). If the media is available and the file successfully opened as detected by step 722, the steps of FIG. 7B are executed, beginning at step 730. In general, for efficiency purposes, certain files may be cached on the hard drive if they meet some set of predetermined threshold criteria, such as if they are relatively small (e.g., less than 64 kilobytes). Thus, if a content file is below the threshold, then it is copied to hard drive at step 732, whereby it effectively becomes stored in a high-speed installable cache (e.g., $76_2$) for the lower speed installable cache (e.g., $76_3$). At step 734, the location of the file is then indexed in the special index 86 to facilitate its lookup, as described above. The content is then returned to the browser application 60 and the retrieval process ends. As can be appreciated, the retrieval process of FIGS. 7A and 7B provides a way to access what may be a large amount of content via a high-bandwidth data source, without the drawbacks associated with pre-stuffing the browser cache 66. Moreover, as described above (FIG. 6), since the media automatically updates its drive letter in the registered mappings 80 each time it is installed, the correct installable cache for a given file is properly identified without requiring user intervention.

As referred to above, the steps of FIG. 7C are executed when the URL pattern is not registered (step 740), or if the file is not found on either the special installable cache directory $76_2$ of the hard drive or on the installable cache $76_3$ of the CD-ROM media (step 742). When the URL pattern is not registered, at step 740 of FIG. 7C, the retrieval process of the cache manager component 64 checks to see if the file is residing in the application's own (browser) cache 66. Note that although feasible, in a preferred implementation, step 740 is only executed when the URL pattern is not registered. In other words, when the URL pattern is registered but the file is not found on either the special installable cache directory $76_2$ of the hard drive or on the installable cache $76_3$ of the CD-ROM media, step 742 is directly performed, (the browser cache 66 is not considered), as indicated by the dashed line in FIG. 7C. Moreover, note that files in the browser cache 66 may be expired and the like, and thus when executed, step 740 further considers these various factors, e.g., in the known manner of conventional browsers. If the content file is cached and otherwise proper (not expired or otherwise invalid), step 740 branches to step 746, described below, while if not properly cached (e.g., missing or expired), step 740 instead branches to step 742 to attempt to download the content from the server. If at step 742 the download fails, step 744 returns an error in the usual manner, and the retrieval process is ended for now. If successful, step 744 continues to step 746. Step 746 tests whether a mapping was registered (e.g., as determined at step 702) for the content that was either obtained via the browser cache 66 or via downloading from the server 49. If no mapping was found, the retrieval process branches to step 748 wherein the application 60 may cache the content or not in its own cache 66, in accordance with its own settings. If there was a mapping, as determined at step 746, then the content is considered to be a supplement to the installable cache 763. In such an event, steps 750 and 752 are respectively executed to copy the file into the special installable cache 762 directory on the hard drive, and index the file so it can be subsequently located. Note that steps 750 and 752 are executed when a mapping is registered, but the file was not found on the media or the special cache corresponding thereto. Thus, although not shown herein, the retrieval process may be designed to discriminate as to why the file was not opened, and thereby only execute steps 750–752 if the correct media was available but the file was not found thereon. Otherwise, via steps 714–718, a user might inadvertently fill the hard drive with a large amount of content by inserting the wrong media and canceling out at the user prompt as described above. To this end, step 720 of FIG. 7A may further set a flag or the like indicating this particular condition, (i.e., available media, file not found), while step 746 may further test the flag setting before branching to step 750.

Figure 5:
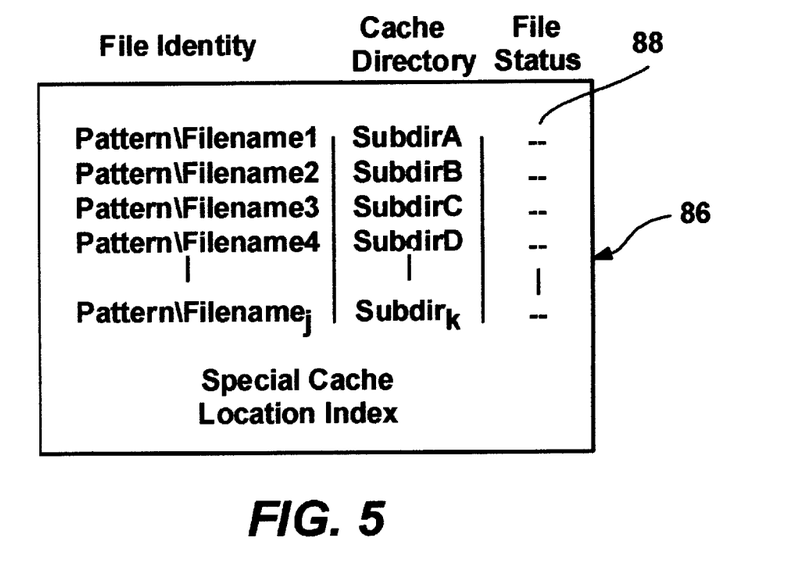
FIG. 5 is a representation of an index maintained for locating cached files in special subdirectories of cached content.

Moreover, the dynamic installable container index 86 may have additional versatility, beyond the indexing of content that does not exist in the installable cache 763. For example, for each entry, the index 86 may maintain information such as in a optional file status field 88 (e.g., bitmask or the like) that indicates when a newer version is available from the server, when files are not found and/or when files are expired. Note that after being examined, (e.g., as part of step 708), the file status information may thus be used to avoid looking on the lower-bandwidth installable cache 763 (e.g., steps 714–722), and either directly use the local hard drive or directly continue to the steps of FIG. 7C (as indicated by the dashed line following step 708) to download the file. As an added feature, for each URL that has a file in an installable cache, there are a number of choices that are controllable by the content provider, e.g., the web site. For example, if the content in the installable cache and the web site is identical, those users with the installable cache may experience the same content, but with faster performance, since the content will be retrieved from the higher bandwidth source. Alternatively, the content on the installable cache may be different, whereby the cache user will experience the content differently than the user accessing the content over the network. For example, the installable cache may include a richer version of content, such as higher-resolution graphics or audio relative to the corresponding web site, whereby those users with the installable cache may have a relatively richer experience. Moreover, if the content on the installable cache does not exist on the web site, the provider may use the installable cache as a mechanism for ensuring that users of their network site have paid a fee or other consideration for access to the content.

Note that the present invention was primarily described above with the local reference having a drive letter. As can be readily appreciated, however, the local reference may alternatively be a "file: reference" to a UNC server, or an http reference to a faster mirror of the server, e.g. mapping http://www.microsoft.com to http://www.microsoft.co.jp.

Lastly, it should be noted that while the invention provides a number of benefits with static content, expiry information may be used with the installable caches of the present invention to provide for dynamic content. For example, instead of simply attempting to open a file and returning the content if successful, expiry information with each file may also be tested. If expired, current expiry information and/or new content may be downloaded, possibly into the installable cache's corresponding special directory, whereby any new content will be used thereafter until it expires. More particularly, if cached content is determined to be expired, new content is usually downloaded content only if the server returns information (via an if-modified-since request) indicating that a newer version is available. If the existing version is not out-of-date, (i.e., a not-modified response) the server may update the cache's expiry information without downloading the content itself. Notwithstanding, with the present invention, the registration may also indicate that an attempt to download from the server should not be performed even if content is not found in the installable cache. As can be readily appreciated, this gives providers the opportunity to have users replace their media with newer versions on a time schedule set by the provider. Alternatively, the times may be essentially infinite, whereby the cached content will never expire, or relatively long so as to only rarely force updates (e.g., after five years, users should obtain a newer version). Of course, users may also be given an option to use some or all of the content, regardless of whether it has expired.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computer system configured to access network content via network access software over a network connection, a method of accessing content, comprising, providing content that corresponds to the network content at a data source that is installable independent of a cache of the network access software, at least some of the content not having been downloaded via the network connection, receiving a request to access the content, the request including a network reference of the content, converting the network reference to a local reference, and accessing the content from the data source based on information corresponding to the local reference.

2. The method of claim 1 wherein converting the network reference to a local reference, registering mapping information in the system, the mapping information comprising information corresponding to the network reference of the content in association with information corresponding to a local reference of the content, and looking up the mapping information using information corresponding to the network reference to obtain the information corresponding to the local reference associated therewith.

3. The method of claim 2 wherein the network reference comprises a uniform resource locator (URL), and wherein registering information corresponding to the network reference of the content in association with information corresponding to a local reference of the content, comprises, registering a pattern corresponding to the URL in conjunction with a file system pattern corresponding to a container of a file system of the computer system.

4. The method of claim 3 wherein looking up the mapping information comprises, determining a URL pattern based on the URL received in the request, and using the URL pattern to retrieve the file system pattern.

5. The method of claim 3 wherein the URL pattern is a prefix and the file system pattern is a prefix.

6. The method of claim 3 wherein accessing the content includes, constructing a file system path and filename from the file system pattern and the URL, and retrieving content via the file system from the path and filename.

7. The method of claim 6 wherein the file system pattern includes a drive identifier, wherein providing content includes providing a physical medium which can be read by a device of the system, the device referenced by a drive identifier of the file system, and further comprising, detecting the medium in the device, and updating the drive identifier in the file system pattern based on the drive identifier of the device.

8. The method of claim 1 wherein providing content includes providing a physical medium which can be read by a device of the computer system.

9. The method of claim 8 wherein the physical medium comprises a CD-ROM and the device comprises a CD-ROM reader.

10. The method of claim 1 wherein accessing the content includes reading the content from a physical medium.

11. The method of claim 1 further comprising copying the content to a disk drive of the system.

12. The method of claim 11 further comprising indexing the location of the content copied to the disk drive.

13. A computer-readable medium having computer-executable instructions for performing the method of claim 1.

14. In a computer system configured to access network content via network access software over a network connection, a system for accessing content, comprising, a data source installable independent of a cache of the network access software, the data source including content corresponding to the network content, at least some of the content not having been downloaded via the network connection, the network access software receiving a request to access the content, the request including a network reference, a conversion mechanism for obtaining a local reference based on the network reference, and an interface for accessing the content from the data source based on the local reference.

15. The system of claim 14 wherein the conversion mechanism comprises a registry of mappings, each mapping including information corresponding to the network reference of the content in association with information corresponding to the local reference of the content, and a look-up mechanism for obtaining the information corresponding to the local reference from the mapping information based on the information corresponding to the network reference.

16. The system of claim 15 wherein the network reference comprises a uniform resource locator (URL), and wherein the registry has registered therein a pattern corresponding to the URL in conjunction with a file system pattern corresponding to a container of a file system of the computer system.

17. The system of claim 16 further comprising a mechanism for constructing a file system path and filename from the file system pattern and the URL, and for providing the path and filename to the interface.

18. The system of claim 16 wherein the file system pattern includes a drive identifier, wherein the data source comprises a device referenced by a drive identifier of the file system, and further comprising a program for updating the drive identifier in the file system pattern based on the drive identifier of the device.

19. The system of claim 16 wherein the pattern corresponding to the URL is a prefix and the file system pattern is a prefix.

20. The system of claim 14 wherein the data source comprises a physical medium in conjunction with a media-reading a device of the computer system.

21. The system of claim 20 wherein the physical medium comprises a CD-ROM and the media-reading device comprises a CD-ROM reader.

22. The system of claim 14 further comprising a storage medium, and wherein the interface further copies the content to the storage medium.

23. The system of claim 22 further comprising an index for recording the location of the content copied to the storage medium.

24. In a computer system configured to access network content identified by a Uniform Resource Locator (URL) via a first connection, a method of accessing content, comprising, providing content corresponding to the network content at a media-reading device of the system that provides data at a rate which is relatively faster than the first connection, at least some of the content not having been downloaded via the first connection, registering a URL pattern in association with a file system pattern, the URL pattern based on the URL of the network content, receiving a request to access the content, the request including the URL, looking up the file system pattern using the URL pattern, and accessing the content from the media-reading device using a file system path and filename based on the file system pattern information and the URL.

25. The method of claim 24 wherein the step of looking up the file system pattern comprises the step of determining a URL pattern based on the URL received in the request.

26. The method of claim 24 wherein URL pattern is a prefix and the file system pattern is a prefix.

27. The method of claim 24 wherein the media-reading device comprises a CD-ROM reader.

28. The method of claim 24 wherein the file system path includes a drive identifier, and wherein the media-reading device is referenced by a drive identifier of the file system, and further comprising, updating the drive identifier in the file system pattern based on the drive identifier of the media-reading device.

29. The method of claim 24 further comprising copying the content from the media-reading device to a storage medium of the system.

30. The method of claim 29 further comprising indexing the location of the content copied to the storage medium.

31. A computer-readable medium having computer-executable instructions for performing the method of claim 24.

32. In a computer system configured to access network content from a network data source via network access software over a network connection, a method of selectively accessing content, comprising, providing content corresponding to the network content at at least one other data source that is installable independent of a cache of the network access software, at least some of the content not having been downloaded via the network connection, registering mapping information, the mapping information comprising a pattern corresponding to a uniform resource locator (URL) of the content in association with a pattern corresponding to a file system reference of the content, receiving a request to access the content, the request including the URL, looking up the mapping information using a pattern derived from the URL to seek the pattern corresponding to the file system reference associated therewith, and, if a mapping is found that indicates the content is available from the at least one other data source, constructing a file system path and filename from the file system pattern and the URL, and accessing the content from that other data source via the path and filename, and if the mapping indicates the content is not available from at least one other data source, downloading the content from the network data source.

33. The method of claim 32 further comprising copying the content to a disk drive of the system.

34. The method of claim 33 further comprising indexing the location of the content copied to the disk drive.

35. The method of claim 34 further comprising, comparing content information to a threshold value, and if the content is below the threshold, copying the content to a disk drive of the system.

36. The method of claim 35 wherein the threshold value is a file size.

37. The method of claim 32 wherein accessing the content from that other data source further comprises evaluating the path and filename to determine if the content further resides on a hard disk drive of the system, and if so, accessing the content from the hard disk drive, and if not, accessing the content from the data source identified via the path and filename.

38. The method of claim 37 wherein evaluating the path and filename includes accessing an index to determine if the content resides on the hard disk drive.

39. The method of claim 32 wherein the URL pattern is a prefix and the file system pattern is a prefix.

40. A computer-readable medium having computer-executable instructions for performing the method of claim 32.

* * * * *